US010247888B2

(12) United States Patent
Zimmel et al.

(10) Patent No.: US 10,247,888 B2
(45) Date of Patent: Apr. 2, 2019

(54) MECHANICAL INTERFACE BETWEEN A FIBER OPTIC CABLE AND A FIBER OPTIC CONNECTOR

(71) Applicant: CommScope Technologies LLC, Hickory, NC (US)

(72) Inventors: Steven C. Zimmel, Minneapolis, MN (US); Yu Lu, Eden Prairie, MN (US); Patrick J. Nault, Carver, MN (US); Scott C. Kowalczyk, Savage, MN (US); Scott Droege, Burnsville, MN (US); Brent Campbell, Minneapolis, MN (US); Christopher Stroth, Lakeville, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/707,252

(22) Filed: Sep. 18, 2017

(65) Prior Publication Data

US 2018/0100972 A1 Apr. 12, 2018

Related U.S. Application Data

(60) Continuation of application No. 14/176,940, filed on Feb. 10, 2014, which is a division of application No. 12/782,929, filed on May 19, 2010, now Pat. No. 8,646,989.

(60) Provisional application No. 61/179,673, filed on May 19, 2009.

(51) Int. Cl.
*G02B 6/36* (2006.01)
*G02B 6/38* (2006.01)

(52) U.S. Cl.
CPC .......... *G02B 6/3869* (2013.01); *G02B 6/381* (2013.01); *G02B 6/3885* (2013.01); *G02B 6/3887* (2013.01); *G02B 6/3821* (2013.01)

(58) Field of Classification Search
USPC .......... 385/81
See application file for complete search history.

(56) References Cited

U.S. PATENT DOCUMENTS 4,611,887 A 9/1986 Glover et al.
4,647,717 A 3/1987 Uken
4,964,685 A 10/1990 Savitsky et al.
5,096,276 A 3/1992 Gerace et al.
5,142,602 A 8/1992 Cabato et al.
5,214,730 A 5/1993 Nagasawa et al.
(Continued)

OTHER PUBLICATIONS

International Search Report and Written Opinion for PCT/US2010/035370 dated Dec. 29, 2010.

*Primary Examiner* — Eric Wong
(74) *Attorney, Agent, or Firm* — Merchant & Gould P.C.

(57) ABSTRACT

A fiber optic connector and cable assembly includes a cable and a fiber optic connector. The connector has a main connector body, a ferrule, a spring for biasing the ferrule, and a spring push for retaining the spring within the main connector body. A crimp band is provided for securing the fiber optic cable to the fiber optic connector. The crimp band includes a first portion securing a cable strength member. The crimp band also includes a second portion crimped down on a jacket of the cable. The crimp band further includes an inner surface having gripping structures for gripping the strength member and/or the jacket.

20 Claims, 9 Drawing Sheets

42
40
44
26
54
56
60
80
64
58
62
28
82
52
84
50

(56) References Cited

U.S. PATENT DOCUMENTS

| | | | | |
|---|---|---|---|---|
| 5,214,731 | A | 5/1993 | Chang et al. | |
| 5,418,874 | A | 5/1995 | Carlisle et al. | |
| 5,943,460 | A | 8/1999 | Mead et al. | |
| 6,499,887 | B2 | 12/2002 | Dean, Jr. et al. | |
| 6,648,520 | B2 | 11/2003 | McDonald et al. | |
| 6,738,555 | B1 | 5/2004 | Cooke et al. | |
| 6,816,661 | B1 | 11/2004 | Barnes et al. | |
| 7,079,734 | B2 | 7/2006 | Seddon et al. | |
| 7,090,406 | B2 | 8/2006 | Melton et al. | |
| 7,104,702 | B2 | 9/2006 | Barnes et al. | |
| 7,137,742 | B2 | 11/2006 | Theuerkorn et al. | |
| 7,146,090 | B2 | 12/2006 | Vo et al. | |
| 7,150,567 | B1 | 12/2006 | Luther et al. | |
| 7,192,195 | B2 | 3/2007 | Turner | |
| 7,204,644 | B2 | 4/2007 | Barnes et al. | |
| 7,270,487 | B2 | 9/2007 | Billman et al. | |
| 7,331,719 | B2 | 2/2008 | Manning et al. | |
| 7,572,065 | B2 | 8/2009 | Lu et al. | |
| 7,594,764 | B2 | 9/2009 | Palmer et al. | |
| 7,628,545 | B2 | 12/2009 | Cody et al. | |
| 7,744,288 | B2 | 6/2010 | Lu et al. | |
| 7,785,019 | B2 | 8/2010 | Lewallen et al. | |
| 8,646,989 | B2 | 2/2014 | Zimmel et al. | |
| 9,766,413 | B2 | 9/2017 | Zimmel et al. | |
| 2002/0164130 | A1 | 11/2002 | Elkins, II et al. | |
| 2005/0238292 | A1 | 10/2005 | Barnes et al. | |
| 2006/0263011 | A1* | 11/2006 | Chen .................... | G02B 6/3817 385/75 |
| 2009/0035993 | A1 | 2/2009 | Okayasu | |
| 2010/0034502 | A1 | 2/2010 | Lu et al. | |
| 2010/0054680 | A1 | 3/2010 | Lochkovic et al. | |
| 2010/0080511 | A1 | 4/2010 | Luther et al. | |
| 2012/0045178 | A1* | 2/2012 | Theuerkorn ......... | G02B 6/3887 385/81 |

* cited by examiner 52
50
22
68
58
SEE FIG.4
26
52
66
44
40
36
42
28
46
38
30
37

50
62
84
58
52
64
56
80
54
60
82
26
44
40
28
42

22
58
124
52
150
152
144
156
SEE FIG.6

50
58
56
52
28
150
152
144
124

22
58
256
244
245
224
SEE FIG.8

50
262
260
52
256
247
245
244
255
28
224

22

SEE FIG.10
356
324
344
324
58
362
52
356 360
344
357
345
324
390
28

SEE FIG.12
458
424
444
459

458
444
459
457
445
490

22

SEE FIG.14
524
556

52
524
28
556
536
544

22

658
SEE FIG.16
50
52
654a
654b
624
50
654a 52
654b
28
624

MECHANICAL INTERFACE BETWEEN A FIBER OPTIC CABLE AND A FIBER OPTIC CONNECTOR

CROSS-REFERENCE TO RELATED APPLICATIONS

This application is a continuation of application Ser. No. 14/176,940, filed Feb. 10, 2014, now U.S. Pat. No. 9,766,413, which application is a divisional of application Ser. No. 12/782,929, filed May 19, 2010, now U.S. Pat. No. 8,646,989, issued Feb. 11, 2014, which application claims the benefit of provisional application Ser. No. 61/179,673, filed May 19, 2009, which applications are incorporated herein by reference in their entirety.

TECHNICAL FIELD

The present disclosure relates to fiber optic data transmission, and more particularly to fiber optic cable connection systems.

BACKGROUND

Fiber optic cables are widely used to transmit light signals for high speed data transmission. The fiber optic cables include an optical fiber or optical fibers. The optical fibers function to carry the light signals (i.e., optical signals). A typical optical fiber includes an inner core surrounded by a cladding that is covered by a coating.

Fiber optic cable connection systems are used to facilitate connecting and disconnecting the fiber optic cables in the field without requiring a splice. A typical fiber optic cable connection system for interconnecting two fiber optic cables includes fiber optic connectors (i.e., optical fiber connectors) mounted at ends of the fiber optic cables, and an adapter for mechanically and optically coupling the fiber optic connectors together. The fiber optic connectors generally include ferrules that support ends of the optical fibers of the fiber optic cables. End faces of the ferrules are typically polished and are often angled. The adapter includes co-axially aligned ports (i.e., receptacles) for receiving the fiber optic connectors desired to be interconnected. The adapter generally includes an internal sleeve that receives and aligns the ferrules of the fiber optic connectors when the connectors are inserted within the ports of the adapter. With the ferrules and their associated fibers aligned and abutted within the sleeve of the adapter, a fiber optic signal can pass from one fiber to the next corresponding fiber via an optical interface created by this arrangement. The adapter also typically has a mechanical fastening arrangement (e.g., a snap-fit arrangement, a latch, etc.) for mechanically retaining the fiber optic connectors within the adapter.

Fiber optic cables are currently being routed to customer premises (e.g., fiber-to the premises). During installation of fiber optic cable in buildings, pulling eyes attached to fiber optic connectors are used to pull fiber optic cables through conduits within the building. The use of pulling eyes attached to fiber optic connectors to pull fiber optic cables through conduits places tension on the mechanical interfaces between the fiber optic connectors and their corresponding fiber optic cables. This can cause the mechanical interfaces to fail under the tension loading. Additionally, during installation of connectorized fiber optic cables, side loads/bending moments can be applied to the fiber optic connectors thereby causing breakage.

SUMMARY

One aspect of the present disclosure relates to a mechanical interface between a fiber optic connector and a fiber optic cable that can withstand relatively high tension loading without failing. In one embodiment, the mechanical interface can withstand at least 75 pounds of tensile loading.

Another aspect of the present disclosure relates to a fiber optic connector having a front end with a ferrule and a rear end adapted to be mechanically coupled to a fiber optic cable. The rear end of the fiber optic connector is configured to resist breakage caused by side loadings/bending moments applied to the fiber optic connector.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
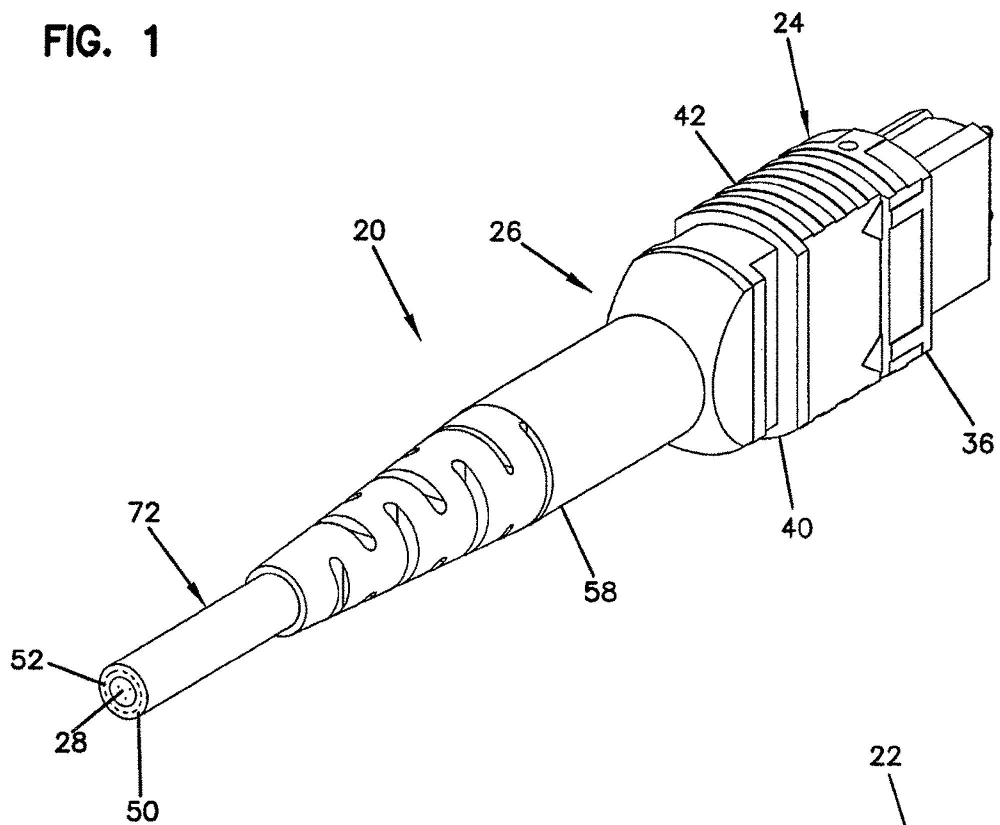
FIG. 1 is a perspective view of a fiber optic cable and connector assembly in accordance with the principles of the present disclosure, the perspective view showing a proximal end of the fiber optic cable and connector assembly.
Figure 2:
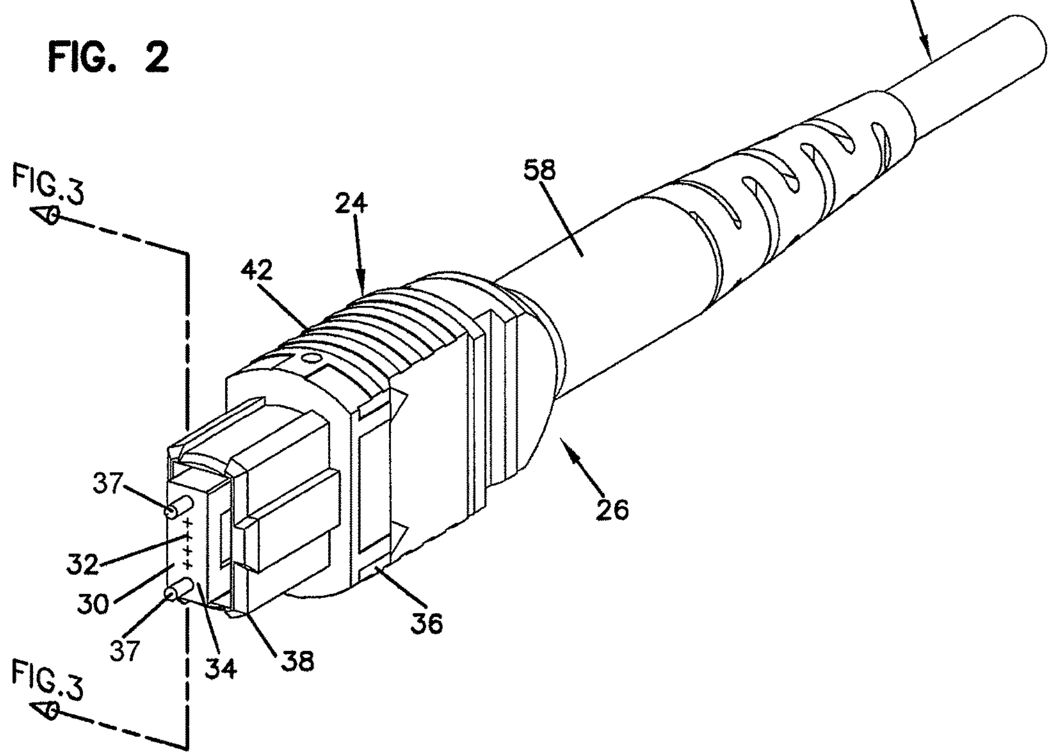
FIG. 2 is another perspective view of the fiber optic cable and connector assembly of FIG. 1, the perspective view showing a distal end of the fiber optic cable and connector assembly.

FIGS. 1 and 2 show a fiber optic cable and connector assembly 20 in accordance with the principles of the present disclosure. The fiber optic connector and cable assembly 20 includes fiber optic cable 22 mechanically connected to a fiber optic connector 24 at a mechanical interface 26. The fiber optic cable 22 includes a plurality of optical fibers 28 (e.g., 12 fibers, 24 fibers, or any other number of fibers) having end portions that terminate at a ferrule 30 of the fiber optic connector 24. The end portions of the optical fibers 28 are typically secured (e.g. with epoxy) within openings defined by the ferrule 30 and have polished ends 32 (shown schematically at FIG. 2) located at an end face 34 of the ferrule 30. The ferrule 30 can include alignment structures (e.g., pins 36, pin receivers, or other structures) for aligning the ferrules of two connectors desired to be connected together. When two fiber optic connectors are connected together, the polished ends 32 of their respective optical fibers 28 are preferably placed in co-axial alignment with one another such that optical transmissions can readily be transferred from fiber to fiber.

Figures 3, 4:
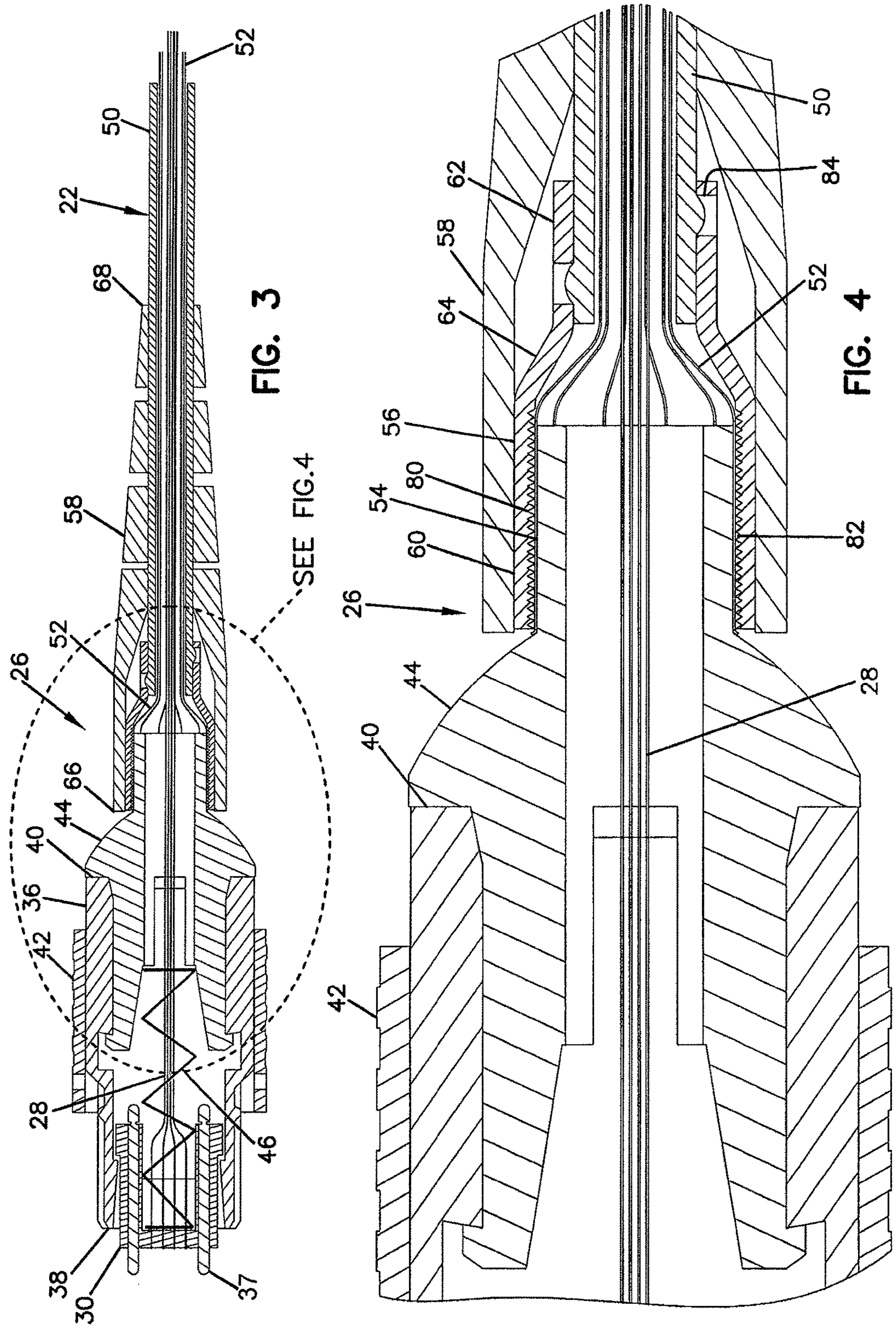
FIG. 3 is a cross-sectional view of the fiber optic cable and connector assembly of FIG. 1, the cross-sectional view taken at a plane illustrated at FIG. 2.
FIG. 4 is an enlarged portion of FIG. 3.

Referring to FIGS. 3 and 4, the fiber optic connector 24 includes a main connector body 36 having a distal end 38 positioned opposite from a proximal end 40. A release sleeve 42 is slidably mounted about the main connector body 36 at a location between the distal end 38 and the proximal end 40. The release sleeve 42 can be slidably retracted on the main connector body 36 to disengage the fiber optic connector 24 from a fiber optic adapter. The ferrule 30 mounts at the distal end 38 of the main connector body 36 and a spring push 44 mounts at the proximal end 40 of the main connector body 36. The spring push 44 engages a spring 46 (shown only at FIG. 3 for clarity) positioned within the main connector body 36 that biases the ferrule 30 in a distal direction. The spring push 44 is secured to the main connector body 36 by a mechanical connection such as a snap-fit connection.

Referring back to FIG. 1, the optical fibers 28 of the fiber optic cable 22 are contained within an outer jacket 50. The fiber optic cable 22 also includes strength members 52 positioned inside the outer jacket 50 and around the optical fibers 28. In one embodiment, the strength members 52 are configured to provide the fiber optic cable 22 with tensile strength without substantially decreasing the flexibility of the fiber optic cable 22. By way of example, the strength members 52 can include the plurality of flexible members such as aramid yarns (i.e., Kevlar).

The mechanical interface 26 includes a crimp supporting stub 54 (i.e., a barrel) that projects proximally outwardly from a main body of the spring push 44, a crimp band 56, and an outer boot 58. The crimp band 56 can be made of a deformable metal material. In one embodiment, the crimp band 56 includes a first portion 60 connected to a second portion 62 by a radial in-step 64. The first portion 60 is crimped over the crimp supporting stub 54 and has a larger transverse cross-dimension than the second portion 62. The first portion 60 of the crimp band 56 functions to secure the strength members 52 of the fiber optic cable 22 to the fiber optic connector 24. Specifically, the strength members 52 are mechanically crimped between the first portion 60 and the outer surface of the crimp supporting stub 54. The second portion 62 is crimped down on the outer jacket 50 of the fiber optic cable 22 to secure the outer jacket 50 to the fiber optic connector 24. The outer boot 58 includes a distal end 66 that mounts over the crimp band 56 and a proximal end that mounts over the fiber optic cable 22. The boot 58 can have a tapered configuration that transitions from a larger cross-dimension adjacent the distal end 66 to a smaller cross-dimension adjacent the proximal end 68.

After crimping, the crimp band 56 can have a number of different transverse cross-sectional shapes. In one embodiment, the crimp band 56 can have a polygonal shape (e.g., a hexagonal shape) after crimping. When the crimp band 56 is crimped over the crimp supporting stub 54, the crimp supporting stub 54 can deform to conform to/match the final shape of the crimp band 56. For example, the crimp supporting stub 54 can have a polygonal shape after crimping. In other embodiments, the crimp band 56 can include at least portions that are generally cylindrical after crimping.

It is desirable for the mechanical interface 26 to be able to withstand an axial tension load of at least 75 pound without failure (i.e., without the fiber optic connector 24 pulling away from the fiber optic cable 22). To improve the ability of the mechanical interface 26 to withstand high tensile loads, the first portion 60 of the crimp band 56 includes an inner surface 80 including strength member biting or gripping features 82 adapted for securely engaging the strength members 52 when the strength members 52 are crimped between the first portion 60 of the crimp band 56 and the crimp supporting stub 54. In certain embodiments, the gripping features 82 can include helical threads, teeth, knurling, projections, bumps or other structures. In certain embodiments, the gripping features 82 have an undulating configuration with relatively sharp peaks and valleys such as those formed by a thread pattern tapped or otherwise formed within the interior of the crimp band 56. In further embodiments, gripping features as described above can also be provided on the exterior surface of the crimp supporting stub 54. In such embodiments, the gripping features of the crimp band and the gripping features of the crimp supporting stub cooperate to secure the strength members between the crimp band and the crimp supporting stub.

To further enhance the ability of the mechanical interface 26 to withstand relatively large tensile loads, the second portion 62 of the crimp band 56 can be provided with gripping features 84 for gripping the outer jacket 50 of a fiber optic cable 22. As shown at FIG. 3, the gripping features 84 include through-holes defined radially through the second portion 62 of the crimp band 56. When the second portion 62 of the crimp band 56 is crimped down on the outer jacket 50, portions of the outer jacket 50 flow or otherwise deform into the through-holes 84 thereby providing a mechanical interlock that assists in maintaining engagement between the outer jacket 50 and the second portion 62 of the crimp band 56. In other embodiments, the gripping features on the second portion 62 may include ridges, bumps, dimples, depressions, teeth, or other structures.

Figures 5, 6:
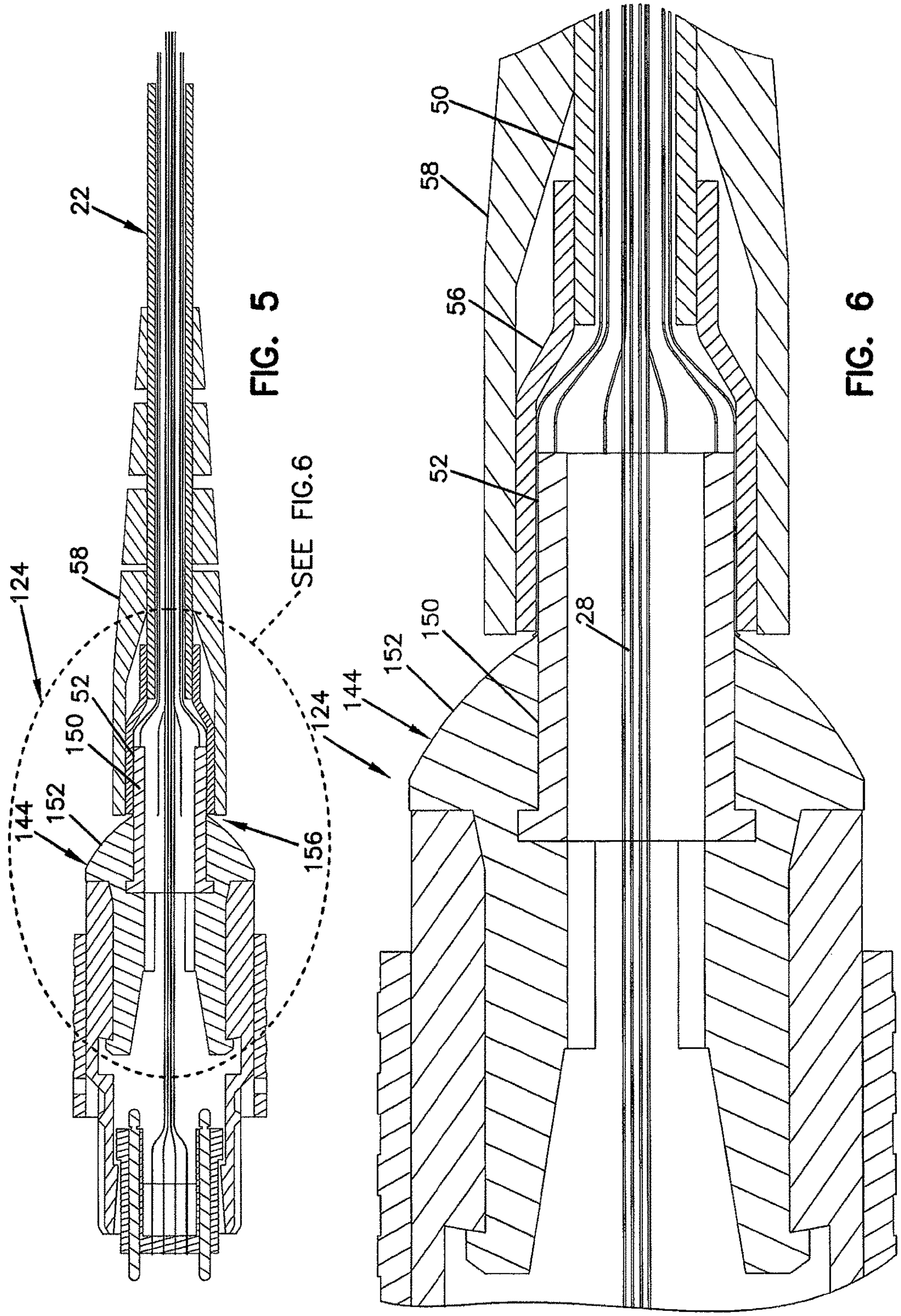
FIG. 5 is a cross-sectional view of another fiber optic cable and connector assembly in accordance with the principles of the present disclosure, the cross-sectional view taken through a pair of pins of the fiber optic cable and connector assembly.
FIG. 6 is an enlarged portion of FIG. 5.

FIGS. 5 and 6 show an alternative fiber optic connector 124. The fiber optic connector 124 has the same components as the fiber optic connector 24 except for the configuration of the spring push. Specifically, the spring push 44 of the fiber optic connector 24 has a solid, homogeneous molded plastic construction. In contrast, the spring push 144 has a composite structure including a metal insert piece 150 embedded within an over-molded plastic piece 152. The metal insert piece 150 forms the crimp supporting stub of the spring push 144. Additionally, the insert piece 150 extends across a region 156 of the spring push 144 thereby providing the region 156 with structural reinforcement. In this way, region 156 is better able to withstand bending loads without breaking.

Figures 7, 8:
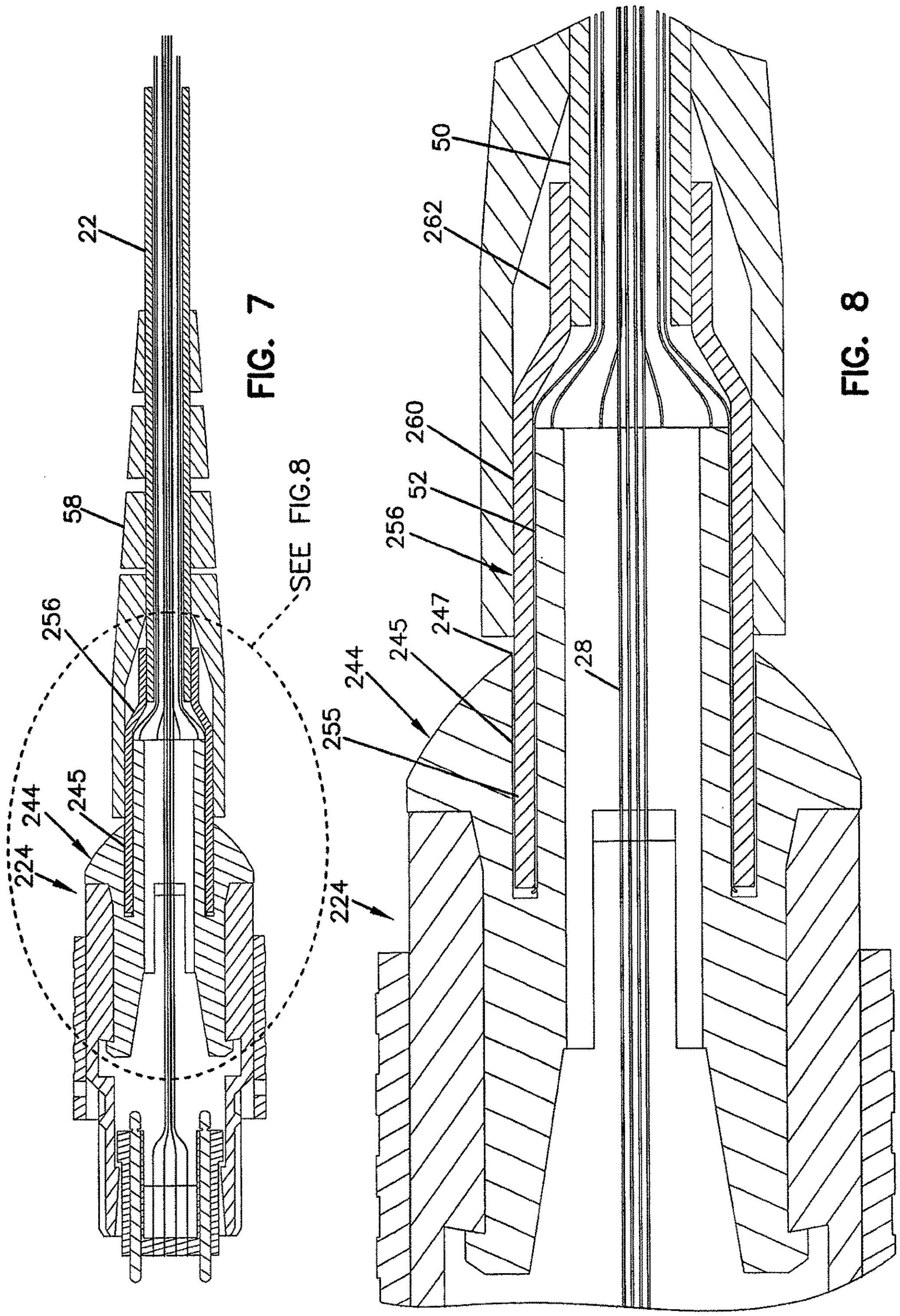
FIG. 7 is a cross-sectional view of another fiber optic cable and connector assembly in accordance with the principles of the present disclosure, the cross-sectional view taken through a pair of pins of the fiber optic cable and connector assembly.
FIG. 8 is an enlarged portion of FIG. 7.

FIGS. 7 and 8 show another fiber optic connector 224 in accordance with the principles of the present disclosure. The fiber optic connector 224 has the same components as the fiber optic connector 24 except the spring push and the crimp band have been modified. Specifically, the fiber optic connector 224 includes a spring push 244 defining an internal annular recess 245 that surrounds a central axis of the fiber optic connector 224. The recess has an open end 247 that faces proximally outwardly from the spring push 244. The recess 245 is configured to receive an extended portion 255 of a crimp band 256 such that the crimp band 256 extends into and reinforces the spring push 244 and the connector body against bending forces applied to the crimp supporting stub. The crimp band 256 also includes a first portion 260 crimped about the crimp supporting stub and a second portion 262 crimped on the outer jacket 50 of the fiber optic cable 22.

Figures 9, 10:
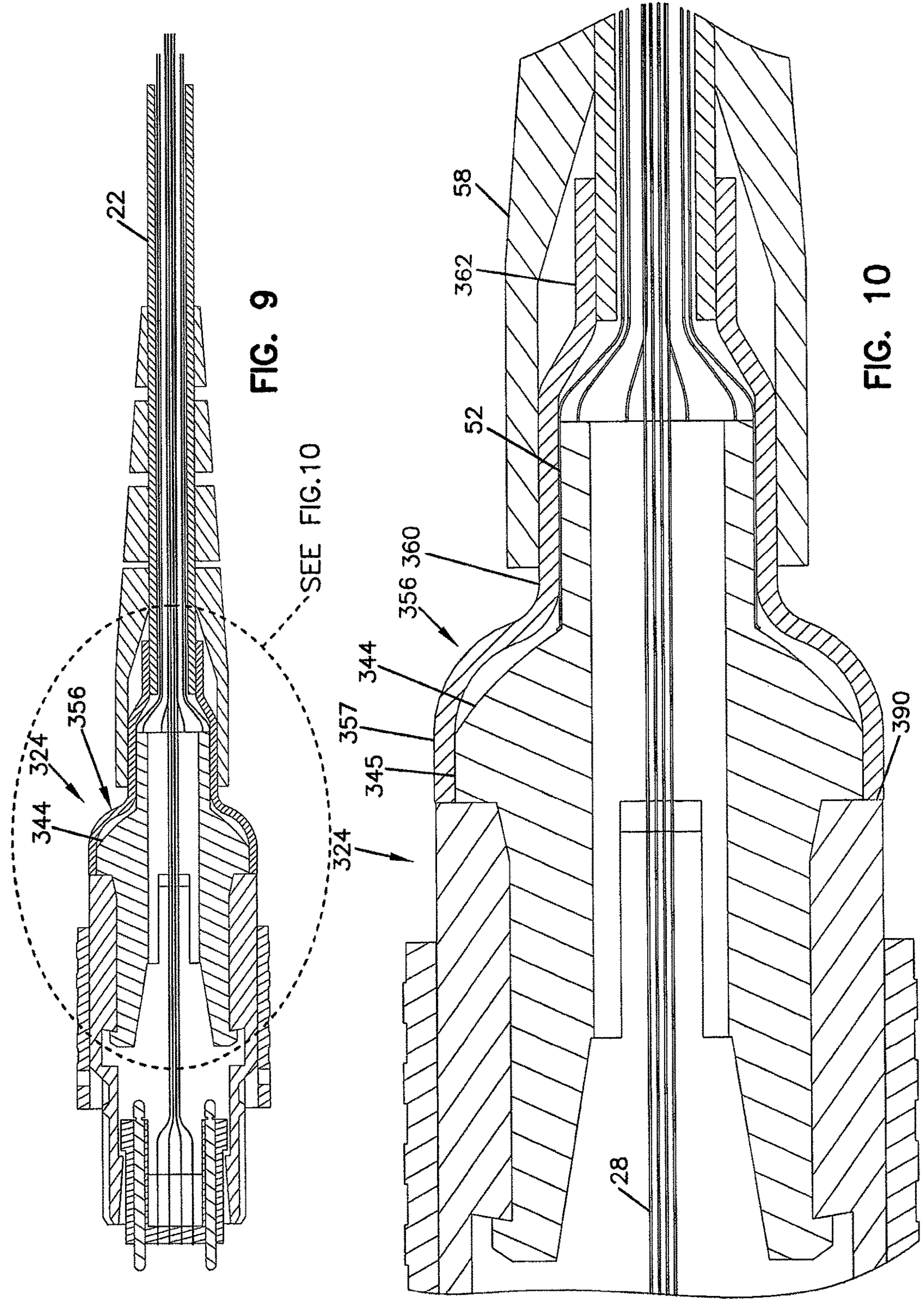
FIG. 9 is a cross-sectional view of another fiber optic cable and connector assembly in accordance with the principles of the present disclosure, the cross-sectional view taken through a pair of pins of the fiber optic cable and connector assembly.
FIG. 10 is an enlarged portion of FIG. 9.

FIGS. 9 and 10 show another fiber optic connector 324 in accordance with the principles of the present disclosure. The fiber optic connector 324 has the same components as the fiber optic connector 24 except the spring push and the crimp band have been modified. Specifically, the fiber optic connector 324 includes a crimp band 356 and a spring push 344. The crimp band 356 includes an enlarged portion 357 that extends distally past the crimp supporting stub and fits over an enlarged region 345 of the spring push 344. The crimp band 356 also includes a first portion 360 crimped about the crimp supporting stub and a second portion 362 crimped on the outer jacket 50 of the fiber optic cable 22. Enlarged portion 357 of the crimp band 356 fits snugly over an enlarged portion 345 of the spring push 344 and reinforces the spring push against bending loads applied to the crimp supporting stub. The enlarged portion 345 of the spring push 344 has a smaller cross-dimension than the cross-dimension of the main body of the connector 324 such that a shoulder 390 is defined at the distal end of the spring push and the proximal end of the main body. The shoulder 390 allows the enlarged portion 357 of the crimp band 356 to be flush or almost flush with the outer surface of the main body of the fiber optic connector 324.

Figures 11, 12:
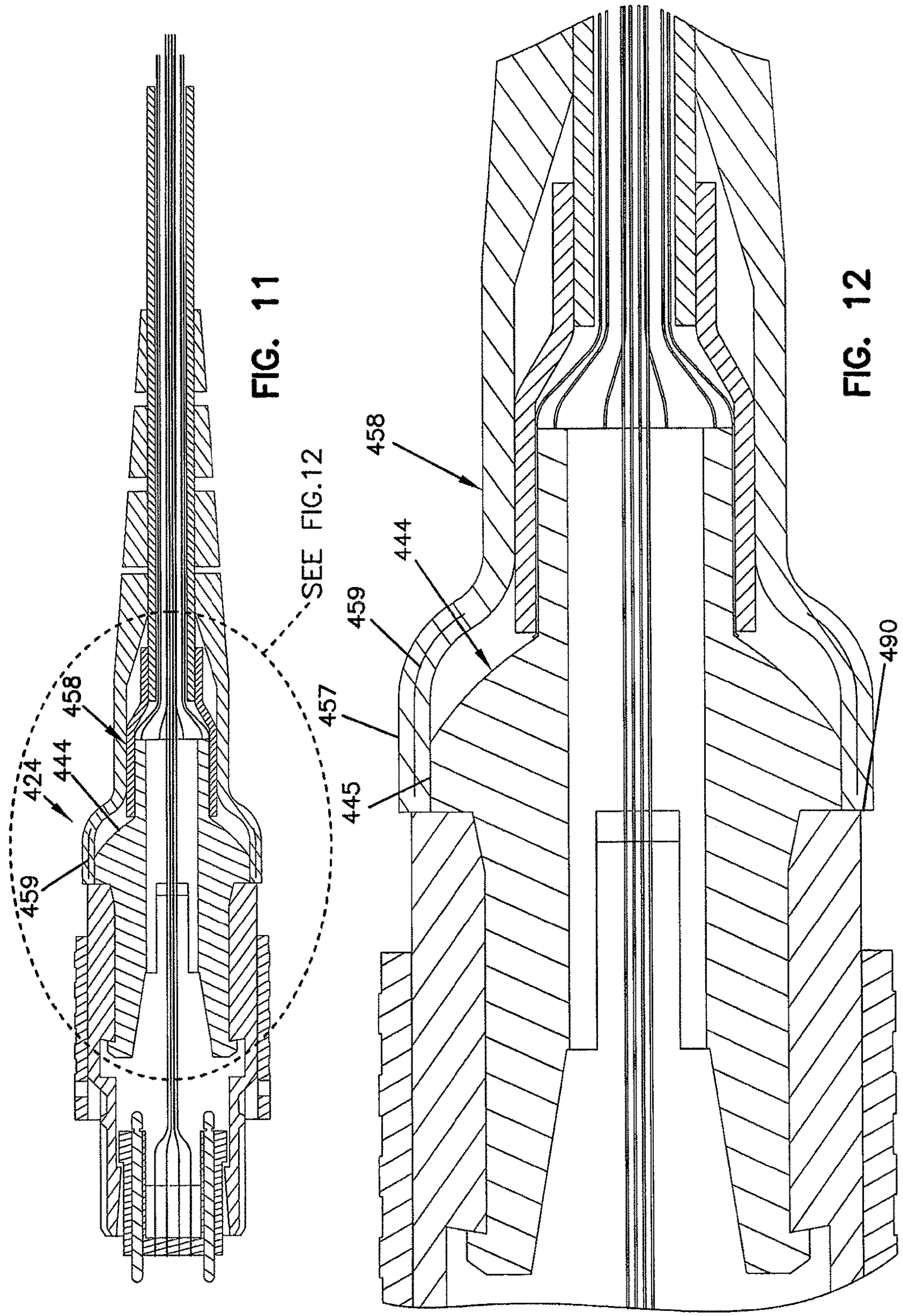
FIG. 11 is a cross-sectional view of another fiber optic cable and connector assembly in accordance with the principles of the present disclosure, the cross-sectional view taken through a pair of pins of the fiber optic cable and connector assembly.
FIG. 12 is an enlarged portion of FIG. 11.

FIGS. 11 and 12 show another fiber optic connector 424 in accordance with the principles of the present disclosure. The fiber optic connector 424 has the same components as the fiber optic connector 24 except the spring push and the boot have been modified. Specifically, the fiber optic connector 424 includes a boot 458 and a spring push 444. The boot 458 includes an enlarged portion 457 that extends distally past the crimp supporting stub and fits over an enlarged region 445 of the spring push 444. The boot 458 can include an internal reinforcing member 459 (e.g., a sleeve such as a metal sleeve). The enlarged portion 457 of the boot 458 fits snugly over an enlarged portion 445 of the spring push 444 and reinforces the spring push against bending loads applied to the crimp supporting stub. The enlarged portion 445 of the spring push 444 has a smaller cross-dimension than the cross-dimension of the main body of the connector 424 such that a shoulder 490 is defined at the distal end of the spring push and the proximal end of the main body. The shoulder 490 allows the enlarged portion 457 of the boot 458 to be flush or almost flush with the outer surface of the main body of the fiber optic connector 424.

Figures 13, 14:
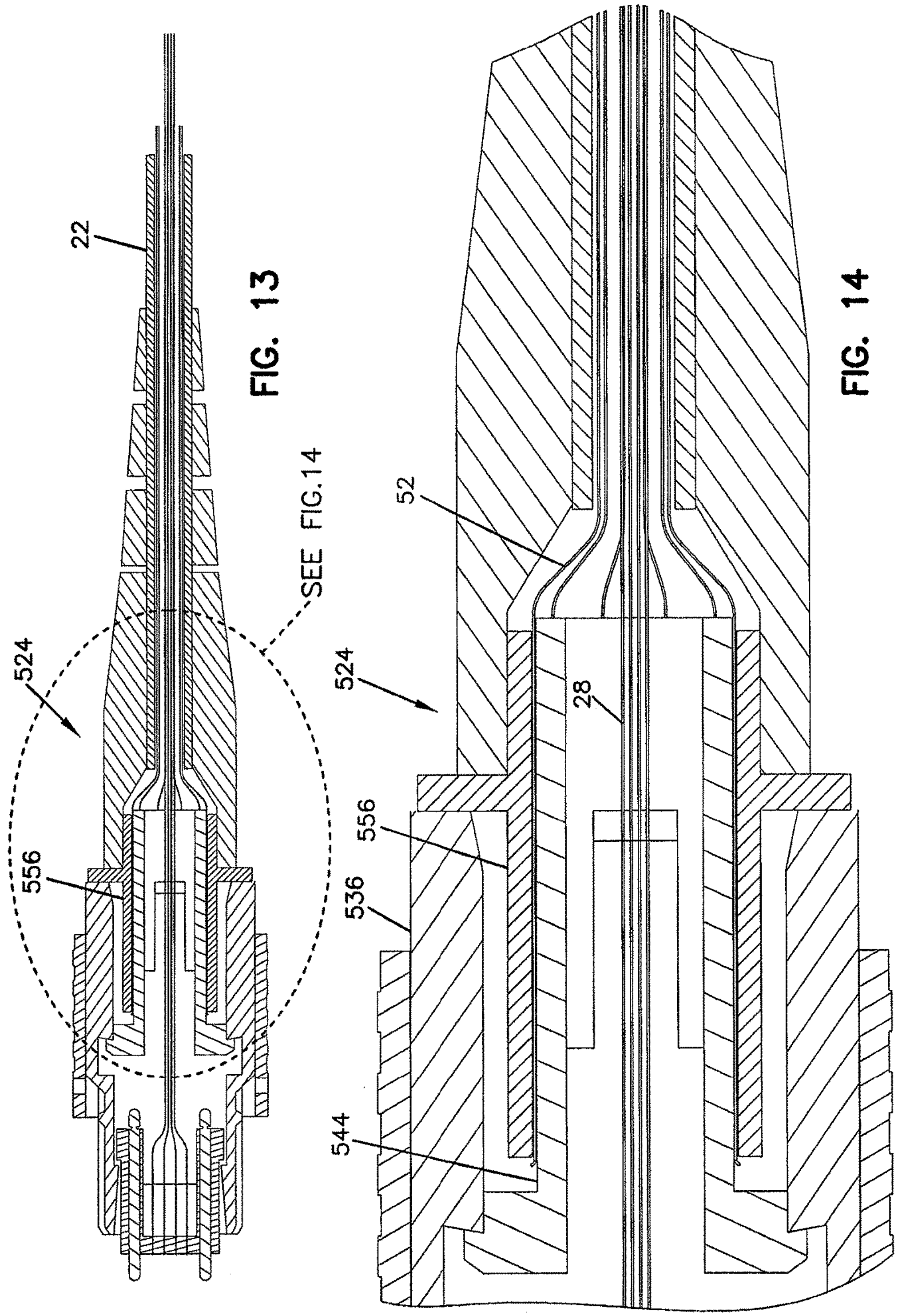
FIG. 13 is a cross-sectional view of another fiber optic cable and connector assembly in accordance with the principles of the present disclosure, the cross-sectional view taken through a pair of pins of the fiber optic cable and connector assembly.
FIG. 14 is an enlarged portion of FIG. 13.

FIGS. 13 and 14 show another fiber optic connector 524 in accordance with the principles of the present disclosure. The fiber optic connector 524 has the same components as the fiber optic connector 24 except the spring push, the crimp band and the connector main body have been modified. The fiber optic connector 524 has a configuration in which a crimp band 556 is crimped over a spring push 544 and includes a crimped portion that extends inside a main connector body 536 of the fiber optic connector 524. During assembly, the strength members 52 of the fiber optic cable are initially crimped onto the spring push 544, and the spring push 544 is then snapped into the back end of the main connector body 536. In this way, the crimp band 556 can be positioned to reinforce the spring push 544 with respect to bending, and in certain embodiments the distance that the crimp supporting stub projects outwardly from the main connector body 536 can be shortened.

Figures 15, 16:
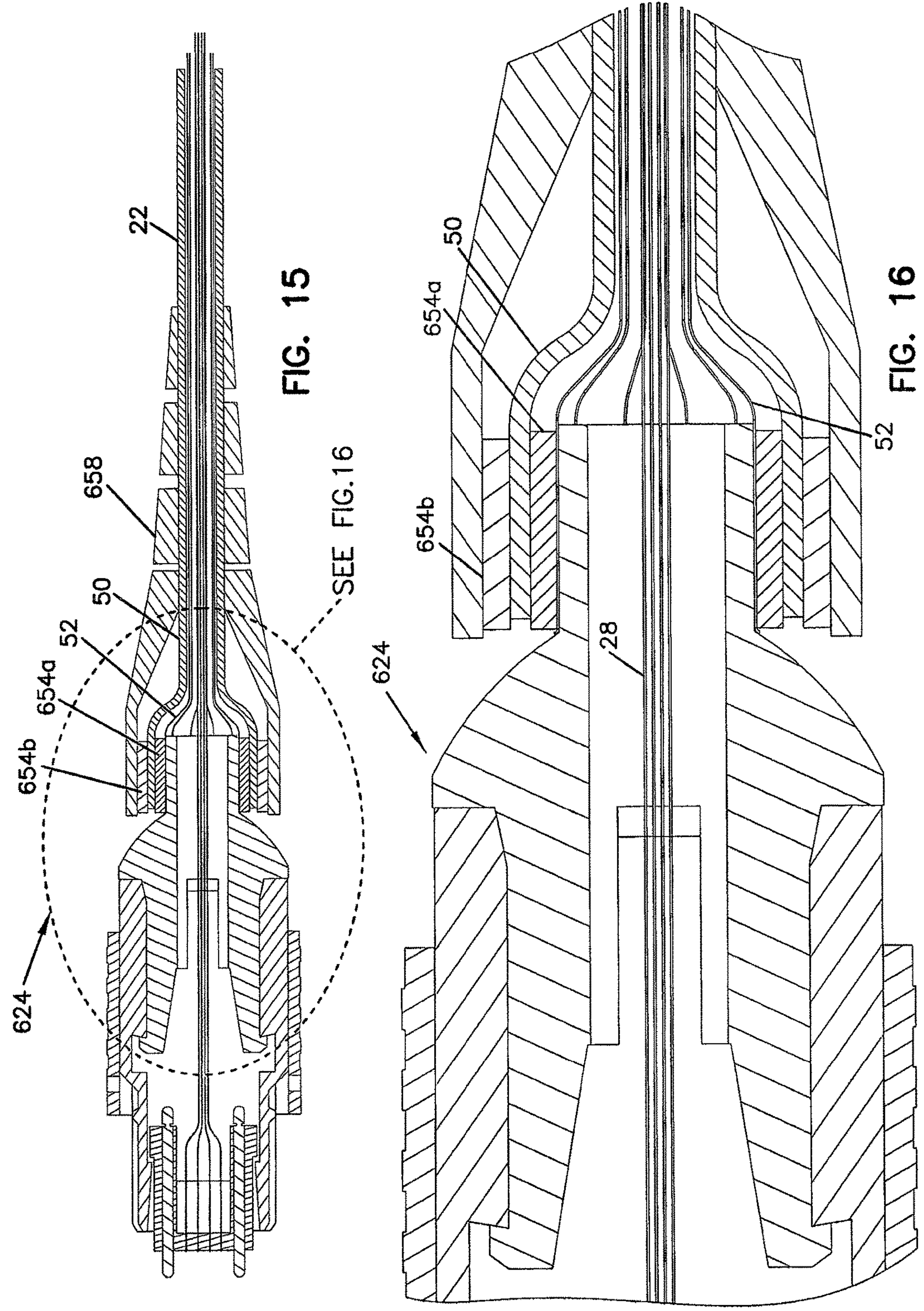
FIG. 15 is a cross-sectional view of another fiber optic cable and connector assembly in accordance with the principles of the present disclosure, the cross-sectional view taken through a pair of pins of the fiber optic cable and connector assembly.
FIG. 16 is an enlarged portion of FIG. 15.

FIGS. 15 and 16 show another fiber optic connector 624 in accordance with the principles of the present disclosure. The fiber optic connector 624 has the same components as the fiber optic connector 24 except a different crimping arrangement is being used. The crimping arrangement is adapted to be shorter in a direction along the longitudinal axis of the connector 624 thereby possibly reducing a bending moment applied to the crimp supporting stub when side loading is applied to the crimp supporting stub through the fiber optic cable and the boot. The crimping arrangement includes a first crimp band **656*a* for crimping the strength members 52 of the fiber optic cable 22 to the crimp supporting stub to secure the strength members 52 to the connector 624. The crimping arrangement also includes a second crimp band 656*b* for crimping the cable jacket 50 over the first crimp band 656*b* to secure the outer jacket 50 to the connector 624. The connector 624 also has a shortened boot 658**.

Figure 17:
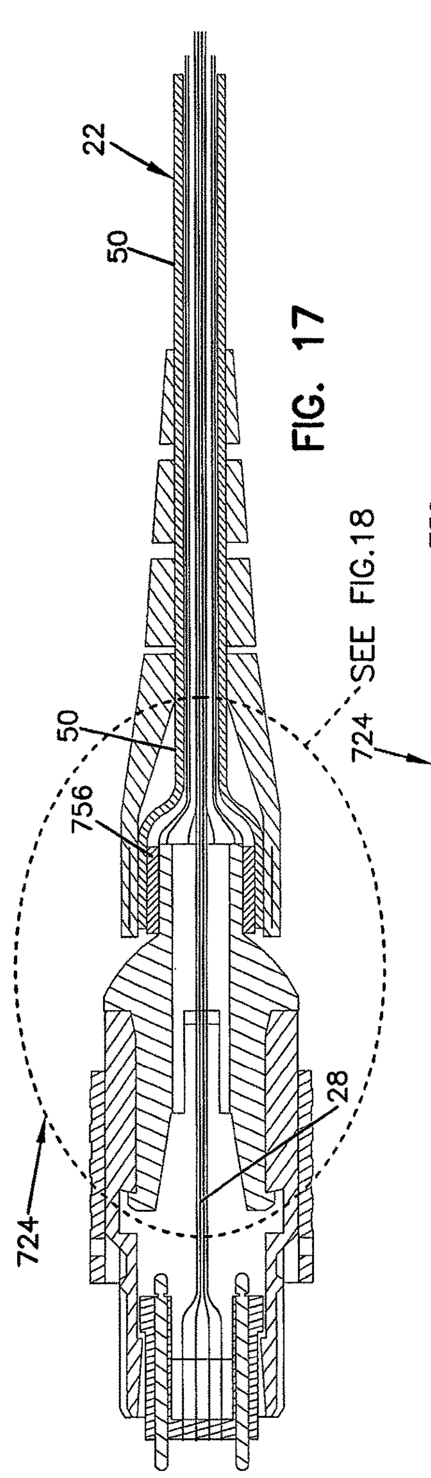
FIG. 17 is a cross-sectional view of another fiber optic cable and connector assembly in accordance with the principles of the present disclosure, the cross-sectional view taken through a pair of pins of the fiber optic cable and connector assembly.
Figure 18:
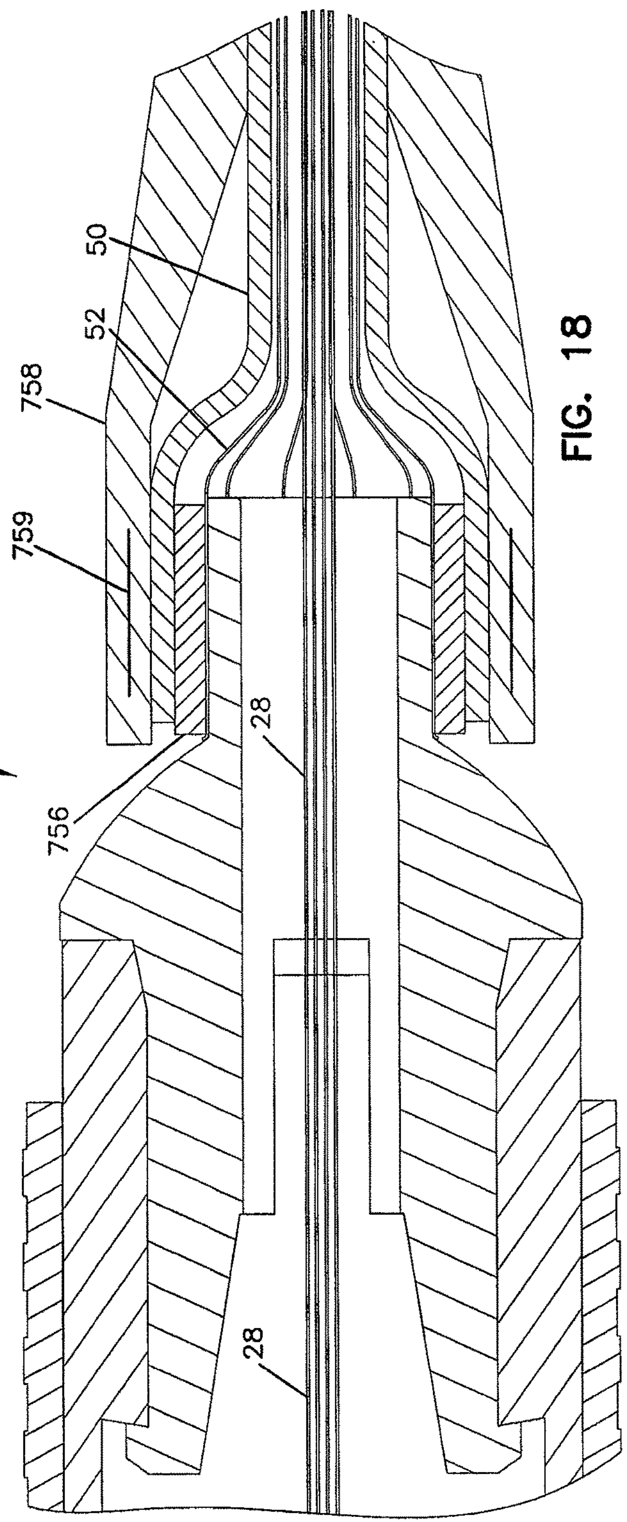
FIG. 18 is an enlarged portion of FIG. 17.

FIGS. 17 and 18 show another fiber optic connector 724 in accordance with the principles of the present disclosure. The fiber optic connector 724 has the same components as the fiber optic connector 24 except a different crimping arrangement is being used. The crimping arrangement is adapted to be shorter in a direction along the longitudinal axis of the connector 724 thereby possibly reducing a bending moment applied to the crimp supporting stub when side loading is applied to the crimp supporting stub through the fiber optic cable and the boot. The crimping arrangement includes a crimp band 756 for crimping the strength members 52 of the fiber optic cable 22 to the crimp supporting stub to secure the strength members 52 to the connector 724. The fiber optic connector 724 also includes a shortened boot 758 having an internal reinforcing member 759 such as a metal reinforcing sleeve. The boot 758 compresses the outer jacket 50 of the fiber optic cable 22 against the outer surface of the crimp band 756 to secure the outer jacket 50 to the fiber optic connector 724.

What is claimed is:

1. A fiber optic connector and cable assembly comprising:

a fiber optic cable including at least one optical fiber, a jacket surrounding the optical fiber and at least one strength member for reinforcing the fiber optic cable;

a fiber optic connector including a crimp supporting portion; and a crimp band for securing the fiber optic cable to the fiber optic connector, the crimp band including a first portion and a second portion, the first portion being crimped down on the crimp supporting portion, the second portion being crimped down on the jacket of the fiber optic cable, the second portion having an inner surface including gripping structures configured to engage the jacket, wherein the gripping structures comprise through-holes into which portions of the jacket deform during crimping.

2. A fiber optic connector and cable assembly comprising:

a fiber optic cable including at least one optical fiber, a jacket surrounding the optical fiber and at least one strength member for reinforcing the fiber optic cable;

a fiber optic connector including a main connector body having a distal end and a proximal end, the fiber optic connector also including a ferrule supporting an end portion of the optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push, the spring push also defining an internal annular recess;

a crimp band for securing the fiber optic cable to the fiber optic connector, the crimp band being crimped down on the stub, the strength member being secured between the crimp band and the stub, and the crimp band including an extended portion that extends into the spring push; and a boot covering the crimp band and a portion of the fiber optic cable, the boot having a tapered configuration.

3. A fiber optic connector and cable assembly comprising:

a fiber optic cable including at least one optical fiber, a jacket surrounding the optical fiber and at least one strength member for reinforcing the fiber optic cable;

a fiber optic connector including a main connector body having a distal end and a proximal end, the fiber optic connector also including a ferrule supporting an end portion of the optical fiber, the ferrule being mounted at the distal end of the main connector body, the fiber optic connector further including a spring for biasing the ferrule in a distal direction and a spring push for retaining the spring within the main connector body, the spring push being mounted at the proximal end of the main connector body, the spring push including a main body and a stub that projects proximally outwardly from the main body of the spring push;

a crimp band for securing the fiber optic cable to the fiber optic connector, the crimp band being crimped down on the stub, the strength member being secured between the crimp band and the stub; and a boot including a first portion covering the crimp band, a second portion covering the fiber optic cable, and a third portion extending over at least a portion of the main body of the spring push, the third portion of the boot including a reinforcing element embedded therein, and the boot having a tapered configuration.

4. The fiber optic connector and cable assembly of claim 1, wherein the fiber optic connector includes a main connector body, a spring push, and a spring therebetween.

5. The fiber optic connector and cable assembly of claim 4, wherein the spring push is mechanically coupled to the main connector body.

6. The fiber optic connector and cable assembly of claim 5, wherein the spring push is snap-fit to the main connector body.

7. The fiber optic connector and cable assembly of claim 4, wherein the crimp supporting portion is a supporting stub of the spring push.

8. The fiber optic connector and cable assembly of claim 1, further comprising an outer boot that mounts over the crimp band.

9. The fiber optic connector and cable assembly of claim 1, wherein the crimp band is able to withstand an axial tension load of at least 75 pound without failure.

10. The fiber optic connector and cable assembly of claim 2, wherein the internal recess surrounds the stub of the spring push.

11. The fiber optic connector and cable assembly of claim 2, wherein the internal recess has an open end that faces proximally outwardly from the spring push.

12. The fiber optic connector and cable assembly of claim 2, wherein the extended portion of the crimp band reinforces the spring push against bending forces applied to the stub.

13. The fiber optic connector and cable assembly of claim 2, wherein the crimp band also includes a first portion crimped about the stub and a second portion crimped on the jacket of the fiber optic cable.

14. The fiber optic connector and cable assembly of claim 2, wherein the internal recess surrounds the stub of the spring push, wherein the extended portion of the crimp band reinforces the spring push against bending forces applied to the stub, and wherein the crimp band also includes a first portion crimped about the stub and a second portion crimped on the outer jacket of the fiber optic cable.

15. The fiber optic connector and cable assembly of claim 3, wherein the reinforcing element includes a metal sleeve.

16. The fiber optic connector and cable assembly of claim 15, wherein the third portion of the boot fits over a largest portion of the spring push.

17. The fiber optic connector and cable assembly of claim 3, wherein the third portion of the boot fits over a largest portion of the spring push.

18. The fiber optic connector and cable assembly of claim 3, wherein the third portion of the boot is flush with an outer surface of the main connector body.

19. The fiber optic connector and cable assembly of claim 18, wherein a largest portion of the main body of the spring push has a smaller cross-dimension than a cross-dimension of the main connector body such that a shoulder is defined at a distal end of the spring push and a proximal end of the main connector body.

20. The fiber optic connector and cable assembly of claim 3, wherein the crimp band has a first portion and a second portion, the first portion being crimped down on the stub, the second portion being crimped down on the jacket of the fiber optic cable.

* * * * *